United States Patent [19]
Breitschwerdt et al.

[11] 4,168,859
[45] Sep. 25, 1979

[54] MOTOR VEHICLE, ESPECIALLY PASSENGER MOTOR VEHICLE WITH SLIDABLE UPPER VEHICLE SECTION

[75] Inventors: Werner Breitschwerdt, Stuttgart; Stefan Heiliger, Offenbach; Hermann Renner, Magstadt, all of Fed. Rep. of Germany

[73] Assignee: Daimler-Benz Aktiengesellschaft, Fed. Rep. of Germany

[21] Appl. No.: 839,771

[22] Filed: Oct. 6, 1977

[30] Foreign Application Priority Data

Oct. 20, 1976 [DE] Fed. Rep. of Germany ....... 2647236

[51] Int. Cl.$^2$ ................................................ B60J 7/10
[52] U.S. Cl. .................................. 296/137 B; 296/102
[58] Field of Search ............ 296/137 B, 99 R, 137 R, 296/102, 26

[56] References Cited

U.S. PATENT DOCUMENTS

| 2,548,105 | 4/1951 | George | 296/137 B |
| 3,610,681 | 10/1971 | Trenkler | 296/137 R |

FOREIGN PATENT DOCUMENTS

| 1580067 | 10/1970 | Fed. Rep. of Germany | 296/137 B |
| 1555187 | 12/1970 | Fed. Rep. of Germany | 296/137 B |

*Primary Examiner*—Robert R. Song
*Attorney, Agent, or Firm*—Craig and Antonelli

[57] ABSTRACT

A motor vehicle, especially a passenger motor vehicle which includes a windshield frame and a rigid section of the vehicle body upper part that can be displaced rearwardly in the vehicle longitudinal direction and is guided inside of the fixed side walls of the vehicle body lower part; the guide means for the displaceable section of the vehicle body upper part are thereby arranged laterally to the rear of the side doors while the displaceable section is adapted to be placed sealingly against the windshield frame when pushed forwardly into its closed position.

22 Claims, 9 Drawing Figures

MOTOR VEHICLE, ESPECIALLY PASSENGER MOTOR VEHICLE WITH SLIDABLE UPPER VEHICLE SECTION

The present invention relates to a motor vehicle, especially to a passenger motor vehicle, with a front windshield frame and with a rigid section of the vehicle body upper part slidable in the vehicle longitudinal direction toward the rear which upper part is guided and covered against the outside within the fixed side walls of the vehicle body lower part.

It is known to construct vehicle body parts or the roof of a convertible sedan so as to be displaceable in the vehicle longitudinal direction in order to facilitate the ingress of the occupants. In contradistinction thereto, the present invention is concerned with the task of providing a passenger motor vehicle with a rigid roof which enables an open drive by the occupants without having to remove the roof or parts thereof.

The underlying problems are solved according to the present invention in that the guidance for the displaceable section of the vehicle body upper part is arranged laterally to the rear of the side doors and the displaceable section is adapted to be sealingly placed against the front windshield frame. According to one embodiment of the present invention, the displaceable section may include an arched roll-over member integrated into the displaceable section which is displaced together with the displaceable section and includes a guidance arranged also inside of the fixed side walls of the vehicle body. On the other hand, an arched roll-over member may also be secured at the vehicle body lower part and then does not partake in the movements of the slidable section of the vehicle body upper part. In this case, a guidance for the upper part of the displaceable section is appropriate in the upper roof area and may cooperate with the fixed roll-over member.

As to the rest, the present invention may also be so constructed that the rear window of the motor vehicle is lowerable and that the luggage space lid can be opened also with a retracted or pushed back section of the vehicle body upper part. On the other hand, the rear window may also be so constructed and possibly may be so equipped with a frame that the displaceable section of the vehicle body upper part is displaceable independently of the position of the rear window or without the same. In order to avoid a displacement of the retracted section of the vehicle body upper part, a locking mechanism of the displaceable section may be provided which enables a holding fast thereof in every position between the most forward and the most rearward position thereof.

Additionally, the guidance for the displaceable section of the vehicle body upper part may be so constructed that the section is lowered down to the end positions shortly before reaching the end positions. A completely satisfactory seal between the roof and the adjoining vehicle parts against the penetration of air draft and rain water is assured thereby.

The guide installation itself consists of guide rails, rollers or slide shoes of conventional construction. The opening and closing of the roof may be carried out mechanically by hand, electrically, pneumatically, hydraulically or in a similar manner.

Accordingly, it is an object of the present invention to provide a motor vehicle, especially a passenger motor vehicle, with a displaceable vehicle body upper section which avoids by simple means the aforementioned shortcomings and drawbacks encountered in the prior art.

Another object of the present invention resides in a passenger motor vehicle with a rigid roof which enables an open drive without having to remove the roof or parts thereof.

A further object of the present invention resides in a motor vehicle, especially a passenger motor vehicle, with a displaceable vehicle body upper section which enables an opening of the roof by a mere rearward displacement of the rigid section with the use of extremely simple means while at the same time affording substantial protection to the passengers of the vehicle in case of accidents, especially in case of a rolling-over of the vehicle.

A still further object of the present invention resides in a motor vehicle, especially in a passenger motor vehicle with a displaceable vehicle body upper section which can be displaced in the rearward direction, yet permits an opening of the luggage lid in all positions of the upper section.

Still another object of the present invention resides in a passenger motor vehicle of the type described above in which a completely satisfactory seal between the roof and the adjoining vehicle parts is assured.

These and other objects, features and advantages of the present invention will become more apparent from the following description when taken in connection with the accompanying drawing which shows, for purposes of illustration only, several embodiments in accordance with the present invention, and wherein.

Figure 8:
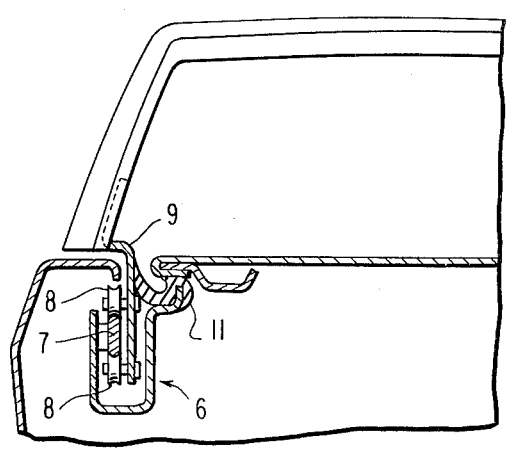
Figure 9:
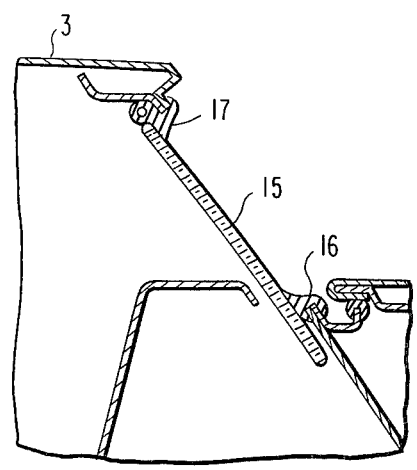

FIG. 8 is a somewhat schematic partial cross-sectional view, on an enlarged scale, through a part of the motor vehicle illustrating a guidance in accordance with the present invention in transverse cross section; and FIG. 9 is a somewhat schematic, partial longitudinal cross-sectional view through the rear portion of the motor vehicle in accordance with the present invention, which illustrates how the rear window seal is constructed.

Figure 1:
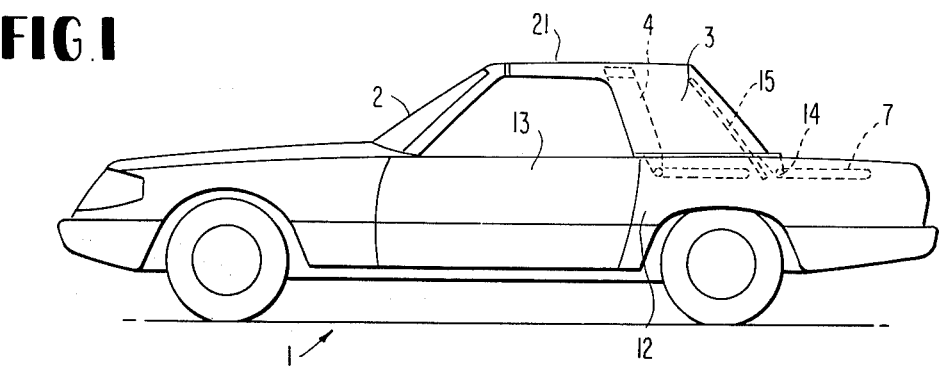
FIG. 1 is a schematic side elevational view of a motor vehicle according to the present invention.

Referring now to the drawing wherein like reference numerals are used throughout the various views to designate like parts, and more particularly to FIG. 1, this figure illustrates a motor vehicle generally designated by reference numeral 1 with a fixed front windshield frame 2 and with a rigid section 3 of the vehicle body upper part which is displaceable in the vehicle longitudinal direction toward the rear. The front windshield frame 2, the displaceable section 3 and an arched roll-over member 4 or 5 (FIGS. 2 and 3) appertain to the vehicle body upper part.

Figure 2:
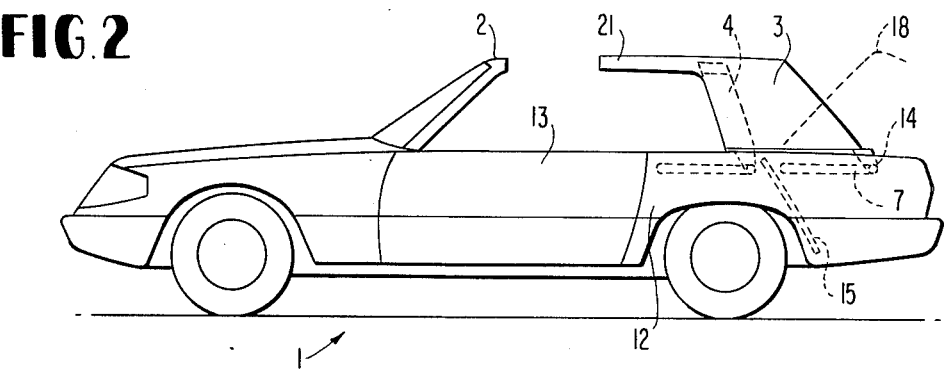
FIG. 2 is a schematic side elevational view of the motor vehicle of FIG. 1 in accordance with the present invention with a pushed-back section of the vehicle body upper part, whereby a roll-over member is integrated into the section of the vehicle body upper part.
Figure 3:
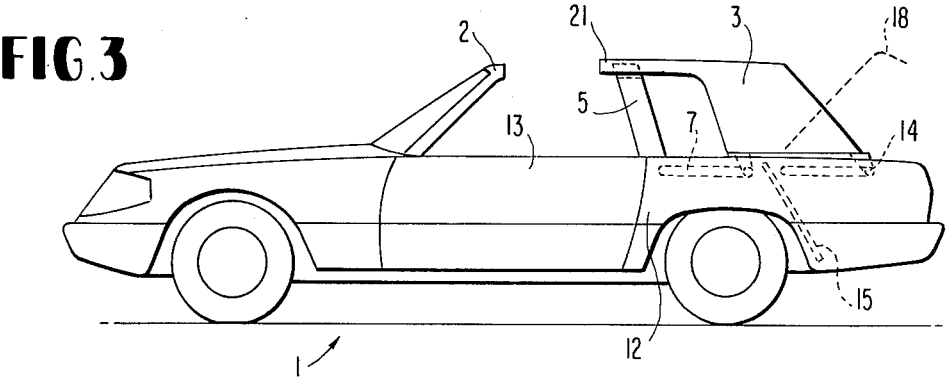
FIG. 3 is a schematic side elevational view of the motor vehicle of FIG. 1 in accordance with the present invention with a pushed-back section of the vehicle body upper part and with a fixed, non-displaced roll-over member, whereby the displaceable section is guided twice in the lower area thereof.

In FIG. 1, the motor vehicle is illustrated with a displaceable section 3 in its initial position, in which it sealingly abuts at the front windshield frame 2. In FIGS. 2 and 3, the displaceable section 3 is displaced toward the rear.

In order to be able to displace the slidable section 3 toward the rear, guide means generally designated by the reference numeral 6, of conventional construction, are provided which are constructed in detail as illustrated in FIG. 8. A guide rail 7, on which run rollers 8, which are secured at a support arm 9 that in turn is secured at the displaceable section 3, form part of the guide means 6. A seal 11 abuts at the support arm 9. For the simplification of the illustration, the guide means are merely indicated in FIGS. 1 to 5 by guide rails 7, along which slide the point of pivotal connection 14 indicated schematically by a circle. The guide means are, in each case, so arranged that they are accommodated at least partially in the vehicle body lower part 12 in the manner according to the present invention and commence only to the rear of the side doors 13.

In FIGS. 1 to 3, embodiments are illustrated in which two guide means are arranged one behind the other in the vehicle body lower part 12. The points of pivotal connection 14 slide along these guide means.

A side view of motor vehicles according to the present invention is illustrated in FIGS. 2 and 3, in which the displaceable sections 3 of the vehicle body upper part are in each case in the pushed-back or retracted position. It can thereby be seen that in the embodiment according to FIG. 2, the roll-over member 4 is integrated into the displaceable section 3 whereas in the embodiment of FIG. 3, the roll-over member 5 is rigidly connected with the vehicle body lower part and remains in its position when the displaceable section 3 is pushed back. In this case, the forward roof part 21 is supported in the open position at the roll-over member 5 so that in case of accidents which lead to a rolling-over of the vehicle, a far-reaching protection of the passenger exists.

A view, as illustrated in FIG. 1, results for both embodiments of FIGS. 1 and 2 with a closed roof.

In FIGS. 1 to 3, also a rear window 15 is indicated which can be cranked up and down by conventional means. In FIG. 1, the rear window 15 is illustrated in the closed condition whereas it is in the lowered condition shown in FIGS. 2 and 3. How the rear window section is constructed is illustrated in cross section in FIG. 9. A seal 16 abuts at the bottom side of the rear window 15 whereas the displaceable section 3 carries a seal 17 which is so constructed that the displaceable section 3 can be displaced without difficulty away from the window toward the rear without taking along the rear window 15 whereas during a displacement of the section 3 in the forward direction, it again abuts against the upper edge of the rear window in such a manner that the same is sealed from the outside against influences such as rain, etc.

By reason of the fact that the rear window 15 does not move along with the displaceable section 3 and can be lowered, as illustrated in FIGS. 2 and 3, the luggage space lid 18 can be opened also when the displaceable section 3 of the vehicle body upper part has been pushed back.

Figure 4:
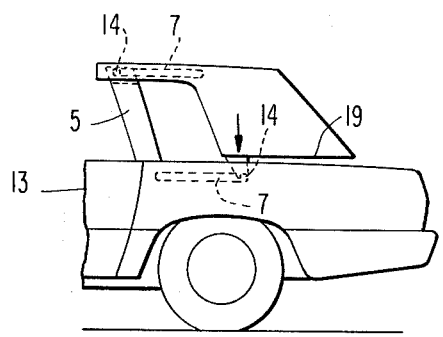
FIGS. 4 and 5 are schematic partial side elevational views of two further embodiments in accordance with the present invention, similar to FIG. 1, in which the guidances for the displaceable vehicle body upper section are arranged at the displaceable section near the top and the bottom thereof.
Figure 5:
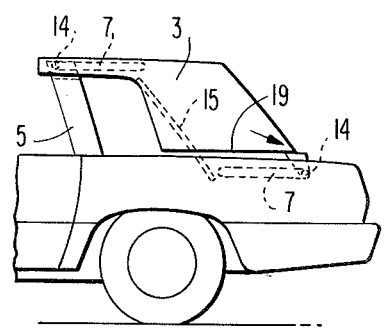

Two embodiments are now illustrated in FIGS. 4 and 5 in which a point of pivotal connection 14 is provided in each case at a fixed roll-over member 5 whereas the second point of pivotal connection 14 is located in each case at the lower edge of the displaceable section 3 of the vehicle body upper part. In the embodiment according to FIG. 4, the point of pivotal connection 14 is provided at the forward end of the lower edge 19 of the displaceable section 3 of the vehicle body upper part and in the embodiment according to FIG. 5, this point of pivotal connection 14 is provided at the rear end of the bottom edge 19 of the vehicle body upper part. The guide rails 7 are arranged correspondingly, on the one hand, in the forward roof part 21 of the displaceable section 3 whereas guide rails, on the other, are provided in the vehicle body lower part. In the embodiment according to FIG. 4, this rail is arranged directly adjoining the side door 13 and in the embodiment according to FIG. 5, it is arranged further to the rear and more particularly to the rear of the window 15.

Figure 6:
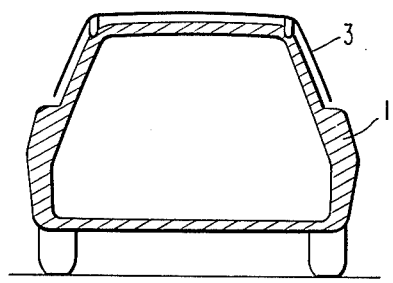
FIGS. 6 and 7 are schematic transverse cross-sectional views through a motor vehicle in accordance with the present invention, which illustrate how the displaceable sections in accordance with the present invention are constructed in relation to the profile of the motor vehicle.
Figure 7:
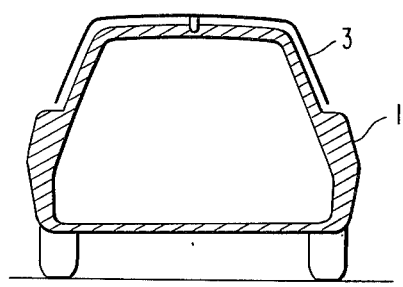

FIGS. 6 and 7 illustrate in cross section how the displaceable section 3 is matched to the body of the motor vehicle 1 and how the guide means 6 for the upper part of the displaceable section 3 can be accommodated either on both sides or in the center of the roof area 21.

The guidance for the displaceable section 3 of the vehicle body upper part may also be so constructed by the use of conventional means (not shown) that the section 3 is lowered down into the end positions shortly prior to reaching the end positions. A completely satisfactory seal between the roof and the adjoining vehicle parts against the penetration of air draft and rain water can be assured thereby by the use of conventional measures.

In addition to the guide rail 7 and the rollers 8, additionally also a locking mechanism of conventional construction appertains to the guide installation 6 which enables a stopping and locking of the displaceable section 3 of the vehicle body upper part in each position between the foremost and rearmost position. An unintentional longitudinal displacement is avoided thereby in every position of the displaced section also during the drive. The opening and closing of the roof can take place manually or by mechanical actuation, for example, mechanically, pneumatically, hydraulically or electrically.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A motor vehicle comprising a vehicle body with a vehicle body upper part, a vehicle body lower part, vehicle side doors, a windshield frame means, and a substantially rigid section forming part of the vehicle body upper part, the substantially rigid section is displaceable toward a rear in a vehicle longitudinal direction, said displaceable substantially rigid section being guided inside of fixed side walls of the vehicle body lower part, characterized in that guide means are provided for guiding the displaceable substantially rigid section relative to the vehicle body lower part, the guide means are arranged at respective lateral sides of the motor vehicle to the rear of the side doors and are adapted to guide said displaceable substantially rigid section substantially horizontally from a position sealingly against the windshield frame means to a position at the rear of the motor vehicle.

2. A motor vehicle according to claim 1, characterized in that the guide means are covered off against the outside of the fixed side walls of the vehicle body lower part.

3. A motor vehicle, comprising a vehicle body with a vehicle body upper part and a vehicle body lower part, a windshield frame means and a substantially rigid section forming part of the vehicle body upper part which is displaceable toward the rear substantially in the vehicle longitudinal direction, said section being guided inside of fixed side walls of the vehicle body lower part, characterized in that guide means for substantially horizontally slidably guiding the displaceable section are arranged laterally respectively to the rear of the side doors, said section being operable to be placed sealingly against the windshield frame means, and in that the displaceable section includes a roll-over member integrated with said section, which is displaced together with the displaceable section and includes guide means also arranged within the fixed side walls of the vehicle body.

4. A motor vehicle comprising a vehicle body with a vehicle body upper part, a vehicle body lower part, vehicle side doors, a windshield frame means, and a substantially rigid section forming part of the vehicle body upper part which is displaceable toward a rear substantially in a vehicle longitudinal direction, said displaceable substantially rigid section being guided inside of fixed sidewalls of the vehicle body lower part, characterized in that guide means are provided for substantially horizontally slidably grinding the displaceable section, the guide means are arranged laterally respectively to the rear of the side doors, said displaceable substantially rigid section being operable to be placed sealingly against the windshield frame means, and in that a roll-over member is secured at the fixed vehicle body lower part and does not partake in movements of the displaceable section of the vehicle body upper part.

5. A motor vehicle according to claim 4, characterized in that guide means include a guide for an upper part of the displaceable substantially rigid section, the guide is accommodated in an upper roof area and cooperates with the fixed roll-over member.

6. A motor vehicle according to claim 5, characterized in that the guide for the upper part of the displaceable substantially rigid section is accommodated substantially in a center of a roof area of the motor vehicle.

7. A motor vehicle according to claim 5, characterized in that the guide of the upper part of the displaceable section is arranged on both sides in the upper roof area.

8. A motor vehicle according to claim 1, with a rear window means, characterized in that the rear window means is adapted to be relatively lowerable independently of the displaceable section and in that a luggage space lid means provided in a rear section of the motor vehicle, the luggage space lid means can be opened also when said displaceable substantially rigid section is in a retracted position at the rear of the motor vehicle.

9. A motor vehicle according to claim 8, characterized in that the means are provided for mounting the rear window means so as to permit the displaceable substantially rigid section to be displaceable independently of a position of the rear window means.

10. A motor vehicle according to claim 9, characterized in that locking means are provided for enabling locking of the displaceable substantially rigid section in each position between a forwardmost position at the windshield frame means and a rearmost position at the rear of the motor vehicle.

11. A motor vehicle according to claim 10, characterized by means are provided for selectively opening and closing said displaceable substantially rigid section.

12. A motor vehicle according to claim 11, characterized in that said last-mentioned means includes a manual means.

13. A motor vehicle according to claim 11, characterized in that said last-mentioned means includes at least one of electrical, pneumatic or hydraulic means.

14. A motor vehicle, comprising a vehicle body with a vehicle body upper part, a vehicle body lower part, a rear window means, a windshield frame means, and a substantially rigid section forming part of the vehicle body upper part which is displaceable toward the rear substantially in the vehicle longitudinal direction, said section being guided inside of fixed sidewalls of the vehicle body lower part, characterized in that guide means for substantially horizontally slidably the displaceable section are arranged laterally respectively to the rear of the side doors, said section being operable to be placed sealingly against the windshield frame means, the rear window means is lowerable, a luggage space lid means is provided in the rear section of the vehicle, the luggage space lid means can be opened also when said section is in the retracted position, the rear window means is so arranged that the displaceable section is displaceable independently of the position of the rear window and without the latter, locking means are provided which enable a locking of the displaceable section in each position between its foremost and rearmost position, the guide means for the displaceable section are so constructed that said section is lowered down into the end positions shortly before reaching the end positions, means are provided for opening and closing said section, and in that the displaceable section includes a roll-over member integrated with said section, which is displaceable together with the displaceable section and includes guide means also arranged within the fixed side walls of the vehicle body.

15. A motor vehicle comprising a vehicle body with a vehicle body upper part, a vehicle body lower part, vehicle side doors, a windshield frame means, a rear window means, and a substantially rigid section forming part of the vehicle body upper part, the substantially rigid section is displaceable toward a rear of the vehicle in a vehicle longitudinal direction, said displaceable substantially rigid section being guided inside of fixed side walls of the vehicle body lower part, characterized in that guide means and provided for substantially horizontally slidably guiding the displaceable section, the guide means are arranged laterally respectively to the rear of the side doors, said displaceable substantially rigid section being operable to be placed sealingly against the windshield frame means, the rear window means is adapted to be lowered, a luggage space lid means is provided in a rear section of the vehicle, the luggage space lid means is adapted to be opened also when said displaceable substantially rigid section is in a retracted position, the rear window means is arranged so that the displaceable substantially rigid section is displaceable independently of a position of the rear window means and without the rear window means, locking means are provided for enabling a locking of the displaceable substantially rigid section in each position between a foremost position at the windshield frame means and a rearmost position at the rear of the vehicle, the guide means for the displaceable substantially rigid section are constructed so that said displaceable substantially rigid section is lowered down into end positions shortly before reaching the end positions, means are provided for opening and closing said displaceable substantially rigid section, and in that a roll-over member is secured at the fixed vehicle body lower part and does not partake in the movements of the displaceable substantially rigid section of the vehicle body upper part.

16. A motor vehicle according to claim 15, characterized in that said guide means include a guide for an upper part of the displaceable substantially rigid section, the guide is accommodated in an upper roof area and cooperates with the fixed roll-over member.

17. A motor vehicle according to claim 16, characterized in that the guide for the upper part of the displaceable substantially rigid section is accommodated substantially in a center of a roof area of the motor vehicle.

18. A motor vehicle according to claim 16, characterized in that the guide means of the upper part of the displaceable section is arranged on both sides in the upper roof area.

19. A motor vehicle according to claim 1, characterized in that locking means are provided for enabling locking of the displaceable substantially rigid section in each position between a forwardmost position at the windshield frame means and a rearmost position at the rear of the motor vehicle.

20. A motor vehicle according to claim 1, characterized in that means are provided for selectively opening and closing said displaceable substantially rigid section.

21. A motor vehicle according to claim 20, characterized in that said last-mentioned means includes a manual means.

22. A motor vehicle according to claim 20, characterized in that said last-mentioned means includes at least one of electrical, pneumatic or hydraulic means.

* * * * *